US009322578B2

(12) United States Patent
Mohebbi et al.

(10) Patent No.: US 9,322,578 B2
(45) Date of Patent: Apr. 26, 2016

(54) QUICK THAW/QUICK CHILL REFRIGERATED COMPARTMENT

(75) Inventors: Behrooz Mohebbi, Cary, NC (US); Ron Anderson, Sidney, OH (US); Bruce Kopf, Cedar Rapids, IA (US); Xiaoyong Fu, Anderson, SC (US); Jon Freesmeier, Cedar Rapids, IA (US); Lou Montuoro, Cedar Rapids, IA (US)

(73) Assignee: Whirlpool Corporation, Benton Harbor, MI (US)

( * ) Notice: Subject to any disclaimer, the term of this patent is extended or adjusted under 35 U.S.C. 154(b) by 2724 days.

(21) Appl. No.: 11/852,355

(22) Filed: Sep. 10, 2007

(65) Prior Publication Data

US 2009/0064686 A1  Mar. 12, 2009

(51) Int. Cl.
   *F25B 21/00* (2006.01)
   *F25D 23/12* (2006.01)

(52) U.S. Cl.
   CPC ............... *F25B 21/00* (2013.01); *F25D 23/12* (2013.01); *F25B 2321/0021* (2013.01); *F25D 2400/16* (2013.01); *F25D 2400/28* (2013.01); *Y02B 30/66* (2013.01)

(58) Field of Classification Search
   CPC .. F25B 21/00; F25B 2321/0021; F25D 23/12; F25D 2400/16; F25D 2400/28; Y02B 30/66
   USPC ...................................... 62/3.1, 3.6
   See application file for complete search history.

(56) References Cited

U.S. PATENT DOCUMENTS

| | | | |
|---|---|---|---|
| 3,108,444 A | 10/1963 | Kahn | |
| 4,392,356 A | 7/1983 | Brown | |
| 4,441,325 A | 4/1984 | Bon-Mardion et al. | |
| 4,464,903 A | 8/1984 | Nakagome et al. | |
| 4,483,341 A * | 11/1984 | Witteles | 606/21 |
| 4,674,288 A | 6/1987 | Kuriyama et al. | |
| 4,702,090 A * | 10/1987 | Barclay et al. | 62/3.3 |
| 5,091,361 A * | 2/1992 | Hed | 505/163 |
| 5,156,003 A * | 10/1992 | Yoshiro et al. | 62/3.1 |
| 5,182,914 A | 2/1993 | Barclay et al. | |
| 5,231,834 A * | 8/1993 | Burnett | 62/3.1 |
| 5,357,756 A | 10/1994 | Lubell | |
| 5,376,184 A | 12/1994 | Aspden | |
| 5,605,047 A * | 2/1997 | Park et al. | 62/3.6 |
| 5,782,094 A * | 7/1998 | Freeman | 62/3.6 |
| 5,934,078 A * | 8/1999 | Lawton et al. | 62/3.1 |
| 5,966,951 A | 10/1999 | Hallin et al. | |
| 6,250,087 B1 | 6/2001 | Owada et al. | |
| 6,412,287 B1 * | 7/2002 | Hughes et al. | 62/3.61 |
| 6,446,441 B1 * | 9/2002 | Dean | 62/3.1 |
| 6,497,276 B2 * | 12/2002 | Clark et al. | 165/206 |
| 6,526,759 B2 | 3/2003 | Zimm et al. | |
| 6,588,216 B1 | 7/2003 | Ghoshal | |
| 7,100,389 B1 * | 9/2006 | Wayburn et al. | 62/259.2 |

(Continued)

OTHER PUBLICATIONS

Tishin et al., "The Magnetocaloric Effect and its Applications", 1.9. 2003., CRC Press, pp. 389-390.*

*Primary Examiner* — Allen Flanigan
*Assistant Examiner* — Filip Zec

(57) ABSTRACT

A food refrigeration appliance having a refrigerated cabinet, a thaw/chill compartment, and a controller for selectively operating the thaw/chill compartment. The compartment is located within the refrigerated cabinet and is heated or cooled by a magneto-caloric element present within the compartment. The controller is electrically coupled to the magneto-caloric element for selective operation.

23 Claims, 4 Drawing Sheets

Quick Cool/Thaw

(56) References Cited

U.S. PATENT DOCUMENTS

| | | | |
|---|---|---|---|
| 2003/0029173 A1* | 2/2003 | Bell et al. | 62/3.3 |
| 2004/0182086 A1* | 9/2004 | Chiang et al. | 62/3.1 |
| 2004/0231339 A1* | 11/2004 | Miozza et al. | 62/3.2 |
| 2004/0261420 A1* | 12/2004 | Lewis | 62/3.1 |
| 2005/0005612 A1* | 1/2005 | Kennedy | 62/3.3 |
| 2005/0022538 A1* | 2/2005 | Takagi | 62/3.1 |

* cited by examiner

QUICK THAW/QUICK CHILL REFRIGERATED COMPARTMENT

BACKGROUND OF THE INVENTION

1. Field of the Invention

The present invention relates generally to the field of refrigeration and more particularly to a compartment for a refrigerated appliance that uses a magneto-caloric effect to quickly thaw and chill food items.

2. Description of the Related Art

Food refrigeration appliances generally have refrigerated cabinets designed to preserve and store food items. Typically, food refrigeration appliances utilize a refrigeration circuit having a compression mechanism, a condenser, an expansion mechanism, and an evaporator all connected in sequence to cool the air inside the refrigerated cabinet. A user usually has the ability to adjust the long term temperature of air inside the refrigerated cabinet by modifying the refrigeration circuit in order to raise or lower the temperature inside the cabinet. However, in such circumstances, it takes a great deal of time for the temperature change to occur.

In many instances, it may desirable for a user to be able to quickly cool or thaw a food item such as when a user is preparing a meal. By changing the temperature of the refrigerated cabinet, either by raising or lowering the temperature, a user can conceivably cool or thaw a food item. However, by changing the temperature of the cabinet, all of the food items within the refrigerated cabinet are affected by the temperature change. This is often not desirable when only one, or a few, food items need to be thawed or cooled. Additionally, as mentioned earlier, it typically takes a substantial amount of time to change the air temperature inside a refrigerated cabinet and is undesirable when a user wishes to quickly thaw/chill a food item.

Accordingly, it can be seen that needs exist for an improved apparatus that enables a user to thaw/chill specific food items without affecting other items within a refrigerated cabinet. Additionally, it can be seen that needs exist for an apparatus that allows a user to quickly thaw/chill desired food items within a refrigerated cabinet. It is to the provision of a device meeting these needs and others that the present invention is directed.

SUMMARY OF THE INVENTION

Briefly described, in a first preferred form the present invention provides a system and method utilizing a magneto-caloric effect for quickly chilling and thawing food items in a food refrigeration appliance. In one aspect, the present invention comprises a refrigerated cabinet and a thaw/chill compartment located within the refrigerated cabinet. Preferably, the thaw/chill compartment has a thaw/chill surface that is heated and/or cooled by a magneto-caloric element. In this aspect, the present invention also comprises a controller electrically coupled to the magneto-caloric element for selectively operating the thaw/chill compartment to thaw or to chill food.

Additionally, in a preferred form of the invention, the food refrigeration appliance has at least one magnet capable of generating a magnetic field for interaction with the magneto-caloric element.

In another form, the invention comprises means for circulating a heat transferable fluid medium within the thaw/chill compartment to cool the magneto-caloric element. Means for circulating such a fluid medium can include a fan, pump, and/or a vacuum.

In still another form, the magneto-caloric element is layered between highly conductive materials having a low thermal capacitance, such as copper, aluminum or tin.

In another aspect, the present invention comprises a food refrigeration appliance having a refrigerated cabinet, a thaw compartment located within the refrigerated cabinet, and a controller. The thaw compartment has a thaw surface that is heated by a magneto-caloric element. The controller is electrically coupled to the magneto-caloric element for selectively operating the thaw compartment to heat the thaw surface and thereby any food placed thereon.

In still another aspect, the present invention comprises a food refrigeration appliance having a refrigerated cabinet, a quick chill compartment located within the refrigerated cabinet, a cooling element, and a controller. The quick chill compartment has a chill surface that is first heated by a magneto-caloric element and then cooled prior to placing food on the chill surface for rapid chilling. The cooling element cools the chill surface after the magneto-caloric element has heated the chill surface. Finally, the controller is electrically coupled to the magneto-caloric element and the cooling element for selectively operating the chill compartment to heat the chill surface, and then to cool the surface. After the surface has cooled, food to be rapidly chilled is placed on the chill surface and the magneto-caloric element is disengaged allowing the temperature of the chill surface to be further lowered, rapidly drawing heat from any food placed thereon.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DESCRIPTION OF THE PREFERRED EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
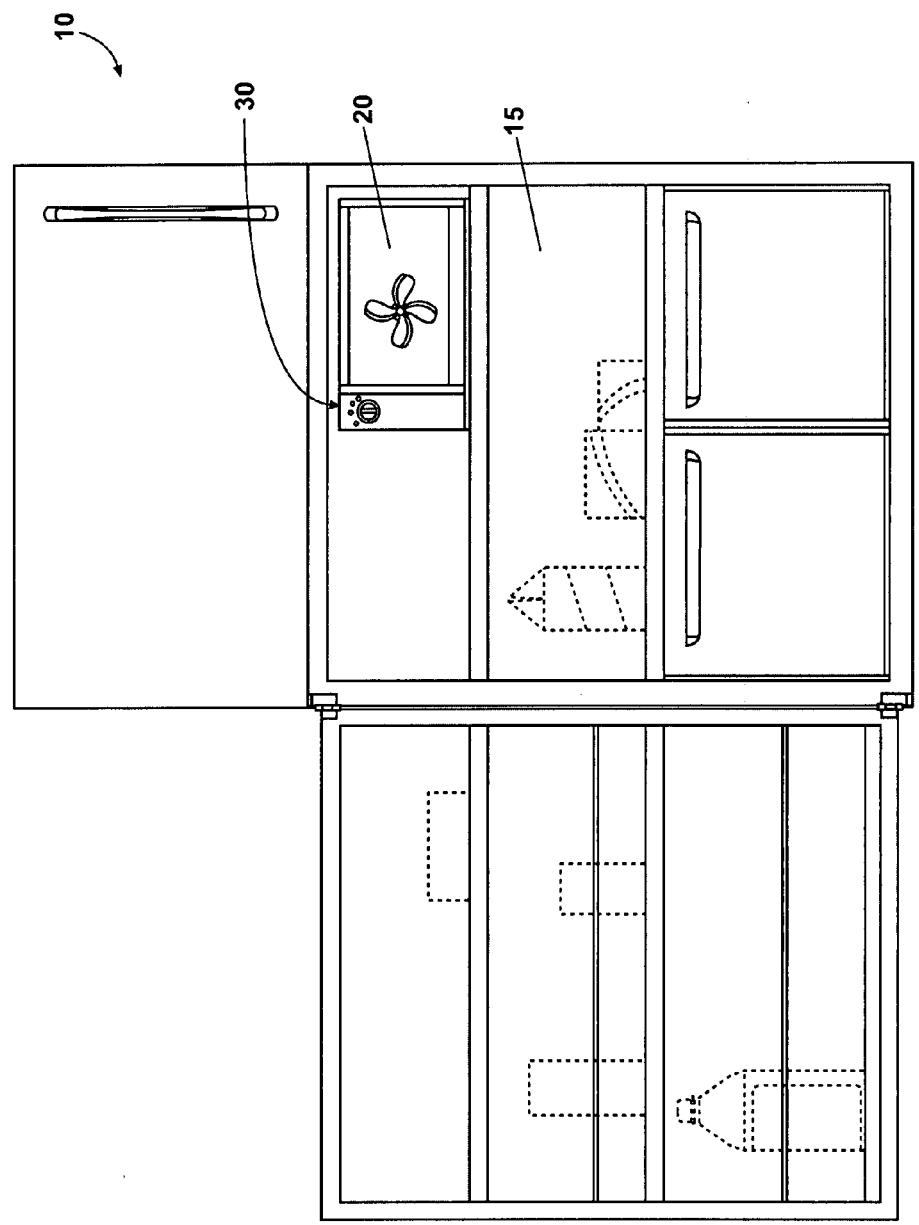
FIG. 1 is a front view of a food refrigeration appliance according to an example embodiment of the present invention having a thaw/chill compartment.

With reference now to the drawing figures, in which like numerals represent like elements or steps throughout the several views, FIG. 1 depicts a food refrigeration appliance 10 according to an example embodiment of the present invention. The food refrigeration appliance 10 generally comprises a refrigerated cabinet 15, a thaw/chill compartment 20, a controller 30 for regulating the thaw/chill compartment, and a selectively operable magnet (not shown). The food refrigeration appliance 10 of the present invention can be a refrigerator, freezer, a combination thereof, or any other like apparatus.

Figure 2:
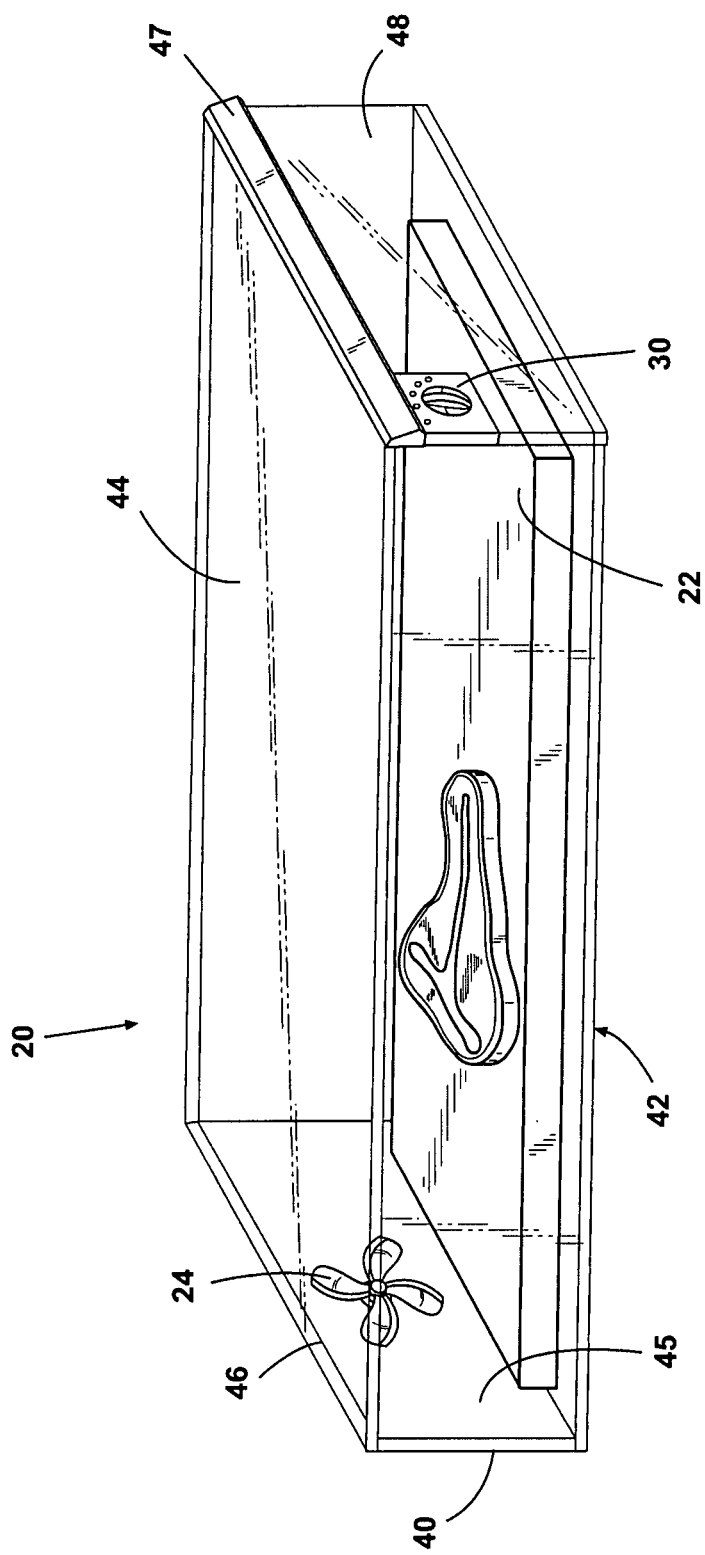
FIG. 2 is a perspective view of the thaw/chill compartment of FIG. 1.

In example embodiments, the thaw/chill compartment 20 is located within the food refrigeration appliance cabinet 15. In its simplest form, the compartment 20 is defined as having a thaw/chill base 22 for receiving a food item thereon and a cooling element 24 as shown in FIG. 2. Preferably, the compartment 20 includes a housing 40 defined by a base panel 42, two side panels 44 & 45, and support members 46 & 47. The housing 40 can be constructed of various materials, including but not limited to, plastic, metal, and/or fiberglass. The front and rear of the compartment can be left open, or can be fitted with a screen 48 or other air permeable material. The base panel 42 can be adapted to receive the thaw/chill base 22 thereon and/or the base panel and thaw/chill base can be integrated together. The thaw/chill base 22 can be a flat surface, pan, or any other shape adapted to receive a food item thereon. The compartment 20 can be fixed within the cabinet 15 or can slide in and out of the cabinet like a drawer. Support member 47 can serve as a handle for allowing a user to slide the compartment 20 in and out of the cabinet 15 if desired.

Figure 3:
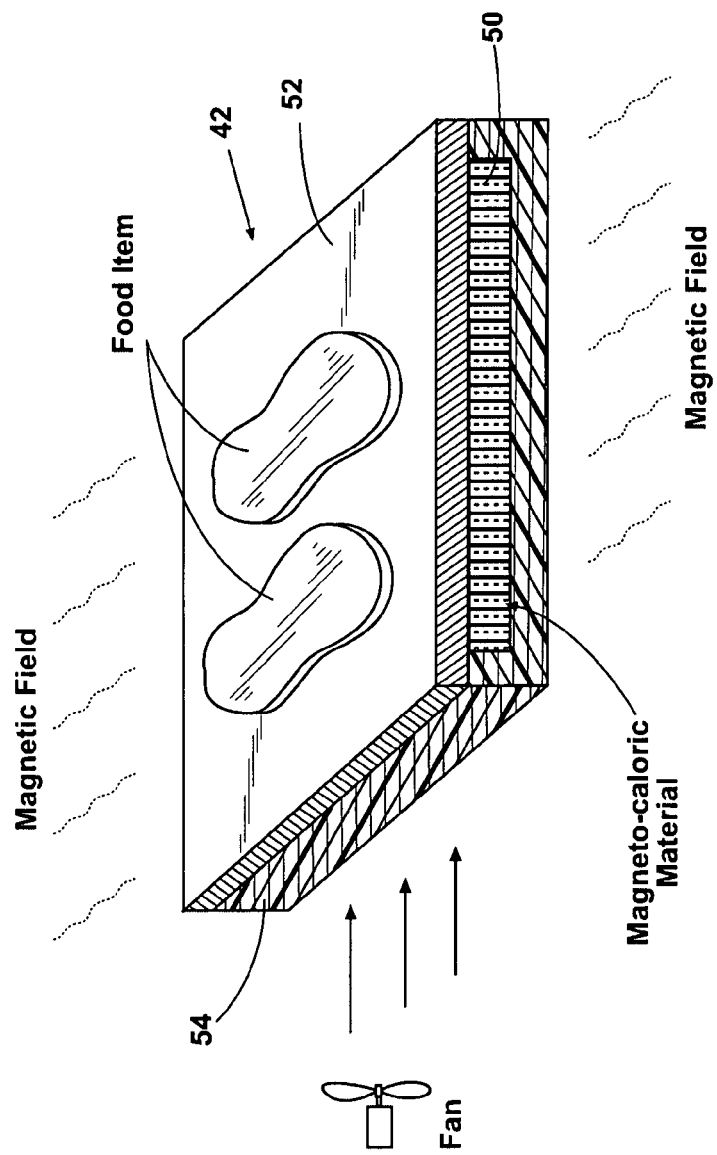
FIG. 3 shows a perspective view of the thaw/chill base of FIG. 2.

The thaw/chill base 22 is comprised, either entirely or a portion thereof, of a magneto-caloric material 50, such as gadolinium and/or gadolinium alloys as seen in FIG. 3. Such materials change temperature when they are exposed to, or removed from, magnetic fields. This phenomenon is typically referred to as the "magneto-caloric effect." In example embodiments, the magneto-caloric material 50 can be placed between layers of highly conductive material 52 having a low thermal capacitance such that the top surface of the base panel 42 is easily heated and cooled. For example, materials such as copper, aluminum, tin, etc. can be used to create such an attribute. In other example embodiments, the magneto-caloric material 50 is preferably surrounded on its sides and base with insulating material 54, whereby heat exchanged between the magneto-caloric material 50 and the surrounding environment is concentrated through the thaw chill base 22.

Figure 4:
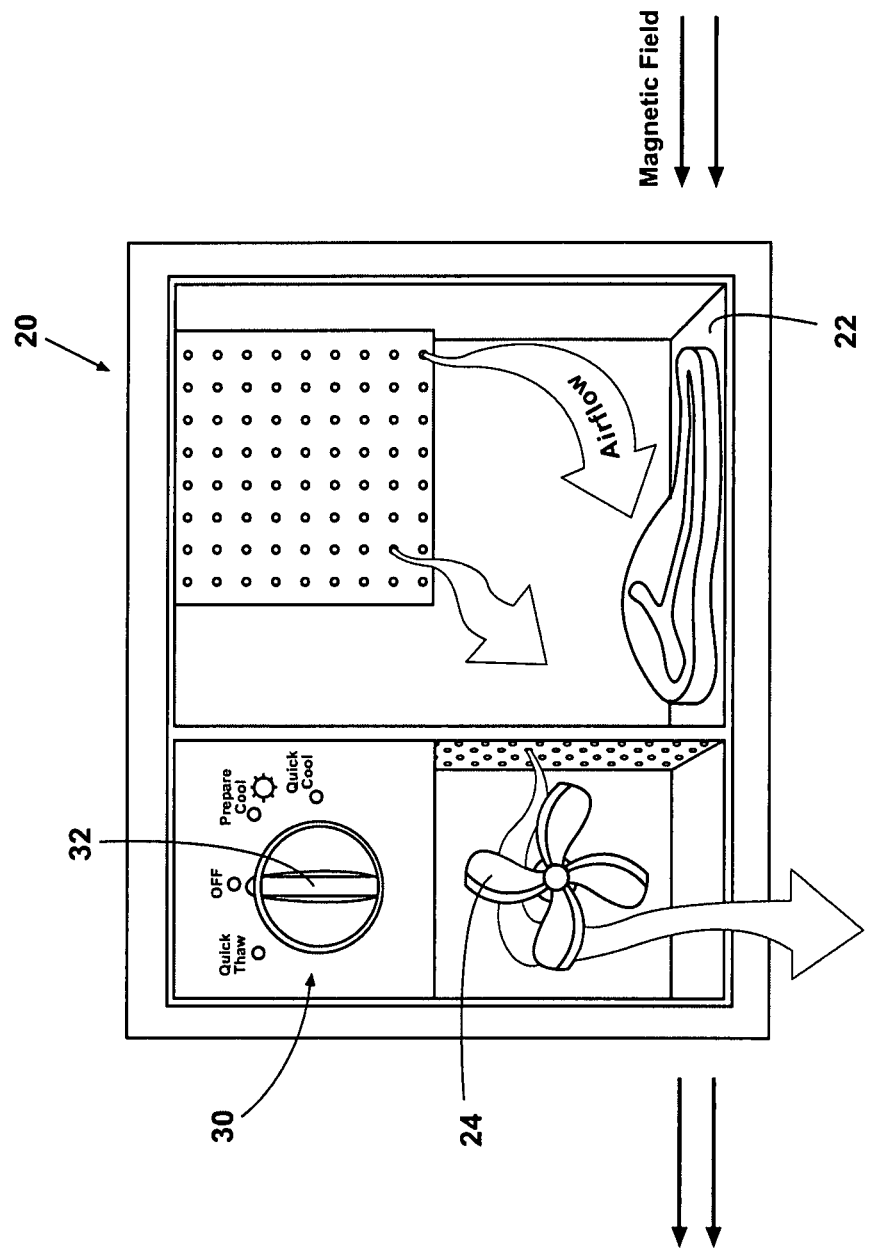
FIG. 4 is a front view of a thaw/chill compartment according to a second example embodiment of the present invention.

The controller 30 can be used to regulate the compartment 20 and operate the magnet field and cooling element 24. In preferred embodiments the controller 30 is integrated within the compartment 20, but can be located anywhere on/in the food refrigeration appliance 10. There are numerous types and methods of controls that can be used to regulate the compartment 20 of the present invention including mechanical switches, knobs, buttons and/or electrical controls and displays. In example embodiments, a control knob 32 is used to regulate and control the use of the compartment 20 as seen in FIG. 4. The controller 30 can be electrically coupled to both the cooling element 24 and the magnet within the food refrigeration appliance 10 to selectively operate the magneto-caloric effect. The controller 30 can control the magneto-caloric effect by controlling the magnetic field produced by the magnet and thus the temperature of the magneto-caloric material 50. The cooling element 24 can also be regulated by the controller 30.

In preferred example embodiments, the cooling element 24 is a fan positioned near the surface of the thaw/chill base 22 to blow refrigerated air over the base. The air to be circulated over the thaw/chill base 22 by the cooling element 24 can be ambient air inside the refrigerated cabinet 15 or can be from an external refrigerated cabinet, such as a freezer. In alternative embodiments, the cooling element 24 can circulate water, refrigerant, or any other heat transferable fluid medium within, or near, the base 22 to cool the same. In still further embodiments, a vacuum is used to circulate air over the thaw/chill base 22.

In operation, a user having a need to quickly thaw a food item using the thaw/chill compartment 20 can first place the item to be thawed onto the thaw/chill base 22. A user can then manipulate the controller 30 such that the magnet, which may be an electromagnet or otherwise, is engaged and produces a magnetic field that interacts with the magneto-caloric material 50 present within the thaw/chill base 22. Engaging the magneto-caloric material 50 with the magnetic field generates heat within the magneto-caloric material. This heat is partly absorbed by the thaw/chill base 22. This absorption of heat by the thaw/chill base 22 raises its temperature (the increase in temperature depends on the thermal mass of the thaw chill base and the magneto-caloric material). The food item is thus thawed as a result of the increase in temperature of the thaw/chill base 22.

Additionally, the thaw/chill compartment 20 can be used to rapidly chill food items. Chilling food may be accomplished by first manipulating the controller 30 to engage the magnet and the magneto-caloric base 50, such that heat is generated by the magneto-caloric material 50 and absorbed by the thaw/chill base 22, which increases the temperature of the thaw/chill base. The controller 30 engages the cooling element 24 to cool the thaw/chill base 22 by removing the excess heat from the same using methods mentioned above, such as a fan, pump, or vacuum to circulate a heat transferable fluid medium in/around the base. In this way, the temperature of the thaw/chill base 22 is kept at or near the temperature of the refrigerated cabinet. In alternative embodiments, the cooling element 24 is only required to operate until the excess heat produced by the magneto-caloric material 50 has been dissipated. In other embodiments no cooling element is required as normal convection can dissipate the excess heat. Regardless, when the thaw/chill base 22 has reached, or is near, the ambient temperature of the refrigerated cabinet a user can then place a food item on the thaw/chill base 22 and manipulate the controller 30 to disengage the magnetic field from interacting with the magneto-caloric material. By removing the magnetic field, the temperature of the thaw/chill base 22 is quickly reduced and rapid chilling of the food item occurs as heat is absorbed by the magneto-caloric material 50.

It shall be noted that in still other embodiments, the food refrigeration appliance 10 can be manufactured with either a quick thaw compartment or a quick chill compartment. When having only a quick thaw compartment, no cooling element 24 is required to dissipate excess heat produced by the magneto caloric material 50. Embodiments of the food refrigeration appliance 10 equipped only with a quick chill compartment may continuously engage the magneto-caloric material 50 with the magnetic field as a default, and only when a user desires to quickly cool a food item is the controller 30 manipulated to disengage the magnetic field. In such embodiments, the magnetic field can be disengaged for a set period of time to allow a user to quickly chill a food item before automatically being engaged again. Additionally, it is conceivable that in such embodiments, no cooling element 24 is needed as the excess heat generated by the magneto-caloric material 50 can be dissipated by normal convection. Furthermore, a refrigerated cabinet 15 can include separate quick thaw and quick chill compartments.

While the invention has been described with reference to preferred and example embodiments, it will be understood by those skilled in the art that a variety of modifications, additions and deletions are within the scope of the invention, as defined by the following claims.

What is claimed is:

1. A food refrigeration appliance comprising:
   a refrigerated cabinet;
   a thaw/chill compartment located within the refrigerated cabinet, the thaw/chill compartment comprising a thaw/chill surface configured to be selectively heated or cooled by a magneto-caloric element adjacent the thaw/chill surface in order to thaw or chill food placed on the thaw/chill surface within the thaw/chill compartment, wherein the magneto-caloric element is configured to give off heat when exposed to a magnetic field and absorb heat when the magnetic field is removed; and
   a controller electrically coupled to the magneto-caloric element for selectively operating the thaw/chill compartment to thaw or to chill food within the thaw/chill compartment by engaging the magneto-caloric element to heat the thaw/chill surface or disengaging the magneto-caloric element to cool the thaw/chill surface.

2. The food refrigeration appliance of claim 1, further comprising at least one magnet capable of generating a magnetic field for interaction with the magneto-caloric element.

3. The food refrigeration appliance of claim 2, wherein the at least one magnet comprises an electromagnet.

4. The food refrigeration appliance of claim 1, further comprising means for moving a heat transfer fluid medium within said thaw/chill compartment to cool the magneto-caloric element.

5. The food refrigeration appliance of claim 4, wherein the means for moving a heat transfer fluid medium is selected from the group consisting of a fan, pump, a vacuum or combination thereof.

6. The food refrigeration appliance of claim 1, wherein the magneto-caloric element is layered between highly conductive materials having a low thermal capacitance.

7. The food refrigeration appliance of claim 6, wherein the highly conductive materials are constructed from aluminum, copper, tin, or a combination thereof.

8. The food refrigeration appliance of claim 1, wherein the magneto-caloric element is comprised of gadolinium.

9. A food refrigeration appliance comprising:
   a refrigerated cabinet;
   a thaw compartment located within the refrigerated cabinet, the thaw compartment comprising a thaw surface that is heated by a magneto-caloric element adjacent the thaw surface, wherein the magneto-caloric element is configured to give off heat when exposed to a magnetic field; and
   a controller electrically coupled to the magneto-caloric element for selectively operating the thaw compartment to heat the thaw surface by engaging the magneto-caloric element thereby thawing food placed on the thaw surface.

10. The food refrigeration appliance of claim 9, further comprising at least one magnet capable of generating a magnetic field for interaction with the magneto-caloric element.

11. The food refrigeration appliance of claim 10, wherein the at least one magnet comprises an electromagnet.

12. The food refrigeration appliance of claim 9, wherein the controller selectively controls the magnetic field produced by the at least one magnet thereby controlling the temperature of the magneto-caloric element.

13. The food refrigeration appliance of claim 9, wherein the magneto-caloric element is layered between highly conductive materials having a low thermal capacitance.

14. The food refrigeration appliance of claim 13, wherein the highly conductive materials are constructed from aluminum, copper, tin, or a combination thereof.

15. A food refrigeration appliance comprising:
   a refrigerated cabinet;
   a quick chill compartment including a chill surface located within the refrigerated cabinet;
   a magneto-caloric element which gives off heat when exposed to a magnetic field and which absorbs heat when the magnetic field is removed, the magneto-caloric element being adjacent the chill surface for heating and cooling the chill surface; and
   a control system for controlling the quick chill compartment and being operable for chilling food to be placed on the chill surface by engaging the magneto-caloric element, transferring heat away from the magneto-caloric element to bring/keep the chill surface near the ambient temperature of the refrigerated cabinet to ready the chill surface to accept a food item for rapid chilling, and disengaging the magneto-caloric element to cool the chill surface and thereby chill the food item.

16. The food refrigeration appliance of claim 15, further comprising a cooling element for transferring heat away from the magneto-caloric element and chill surface.

17. The food refrigeration appliance of claim 16, wherein the cooling element is selected from the group consisting of a fan, pump, vacuum or combination thereof.

18. The food refrigeration appliance of claim 15, further comprising at least one magnet capable of generating a magnetic field for engaging the magneto-caloric element.

19. The food refrigeration appliance of claim 18, wherein the at least one magnet is an electromagnet.

20. The food refrigeration appliance of claim 15, wherein the chill surface is comprised of a first material having magneto-caloric properties and a second material having a low thermal capacitance and high temperature conductivity.

21. The food refrigeration appliance of claim 15, wherein the chill surface is comprised of gadolinium, gadolinium alloy or combinations thereof.

22. The food refrigeration appliance of claim 1, wherein the magneto-caloric element is directly adjacent the thaw/chill surface.

23. The food refrigeration appliance of claim 9, wherein the magneto-caloric element is directly adjacent the thaw surface.

* * * * *